July 19, 1960
R. R. ADAMS
2,945,453
CONVEYOR SYSTEM
Filed July 10, 1957
5 Sheets-Sheet 1
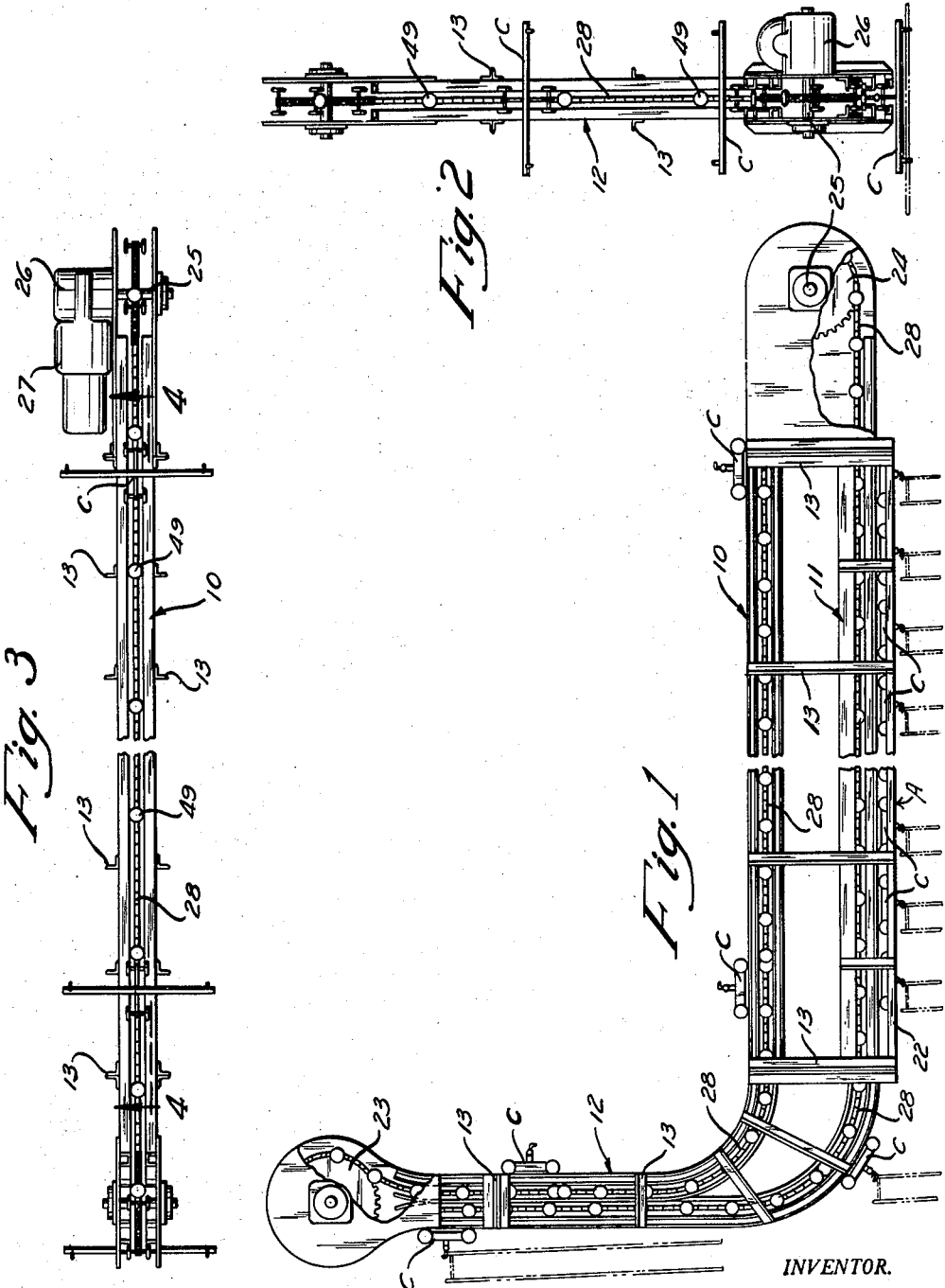
INVENTOR.
RUDOLPH R. ADAMS
BY
RICHEY, WATTS, EDGERTON,
McNENNY & FARRINGTON
A.H. Edgerton
ATTORNEYS INVENTOR.
RUDOLPH R. ADAMS
BY
RICHEY, WATTS, EDGERTON,
McNENNY & FARRINGTON
ATTORNEYS.

July 19, 1960 R. R. ADAMS 2,945,453
CONVEYOR SYSTEM
Filed July 10, 1957 5 Sheets-Sheet 3

INVENTOR.
RUDOLPH R. ADAMS
BY
RICHEY, WATTS, EDGERTON,
McNENNY & FARRINGTON
ATTORNEYS

July 19, 1960 R. R. ADAMS 2,945,453
CONVEYOR SYSTEM
Filed July 10, 1957 5 Sheets-Sheet 5

INVENTOR.
RUDOLPH R. ADAMS
BY
RICHEY, WATTS, EDGERTON,
McNENNY & FARRINGTON
ATTORNEYS

United States Patent Office 2,945,453
Patented July 19, 1960

2,945,453

CONVEYOR SYSTEM

Rudolph R. Adams, 4023 E. 29th St., Cleveland, Ohio

Filed July 10, 1957, Ser. No. 671,081

6 Claims. (Cl. 104—172)

This invention relates broadly to conveyors, and more specifically to conveyors of the type that embody an overhead track having an accumulator station therein to arrest the movement of the work carried by the conveyor and hold it in a stationary position for a predetermined period of time.

One of the objects of the invention is to provide a power driven endless chain between a pair of track rails having a cam plate thereon for operating a coupling mechanism engageable with the work supporting carriages to effect the operative connection and release thereof while they are held in the accumulator station.

Another object of the invention is to provide a plurality of carriages, each having a rod thereon arranged for telescopic engagement with a kerfed sleeve carried by the track to assure the lineal and transverse alignment of the carriages in the accumulator.

Another object of the invention is to provide screw threaded buffers on the carriages to facilitate lineal adjustment of the respective carriages when at rest in the accumulator.

Further objects of the invention reside in the provision of pivotally mounted stop arms on the track to arrest axial movement of the carriages in the accumulator station, and to further provide inclined cam plates on the coupling levers to depress the stop arms as the levers pass thereover and effect the release thereof.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a side elevational view of the improved conveyor, portions thereof being broken away in the interest of clarity;

Fig. 2 is an end elevational view thereof;

Fig. 3 is a plan view of the conveyor shown in Fig. 1;

The conveyor illustrated herein is used in a factory engaged in the manufacture of bed springs and mattresses. The conveyor carries springs from one floor to another and across a portion of the floor of the lower room. In this installation, the springs are hooked to the conveyor carriages on the upper floor and descend through an opening to the track and accumulator section mounted on the ceiling of the subjacent room. Similar units are employed in the plant to convey the springs (and the mattress as the work proceeds) to lower floors and/or the areas where additional work is progressively performed. Since the unit shown herein is typical of the structure of the other units in the plant, description thereof will be omitted.

It is to be understood that the conveyor may be used to handle other material than the springs and mattresses illustrated herein, and that the invention pertains to the structure of the track, the accumulator station therein, and to the work supporting carriages and their appurtenances.

Figure 4:
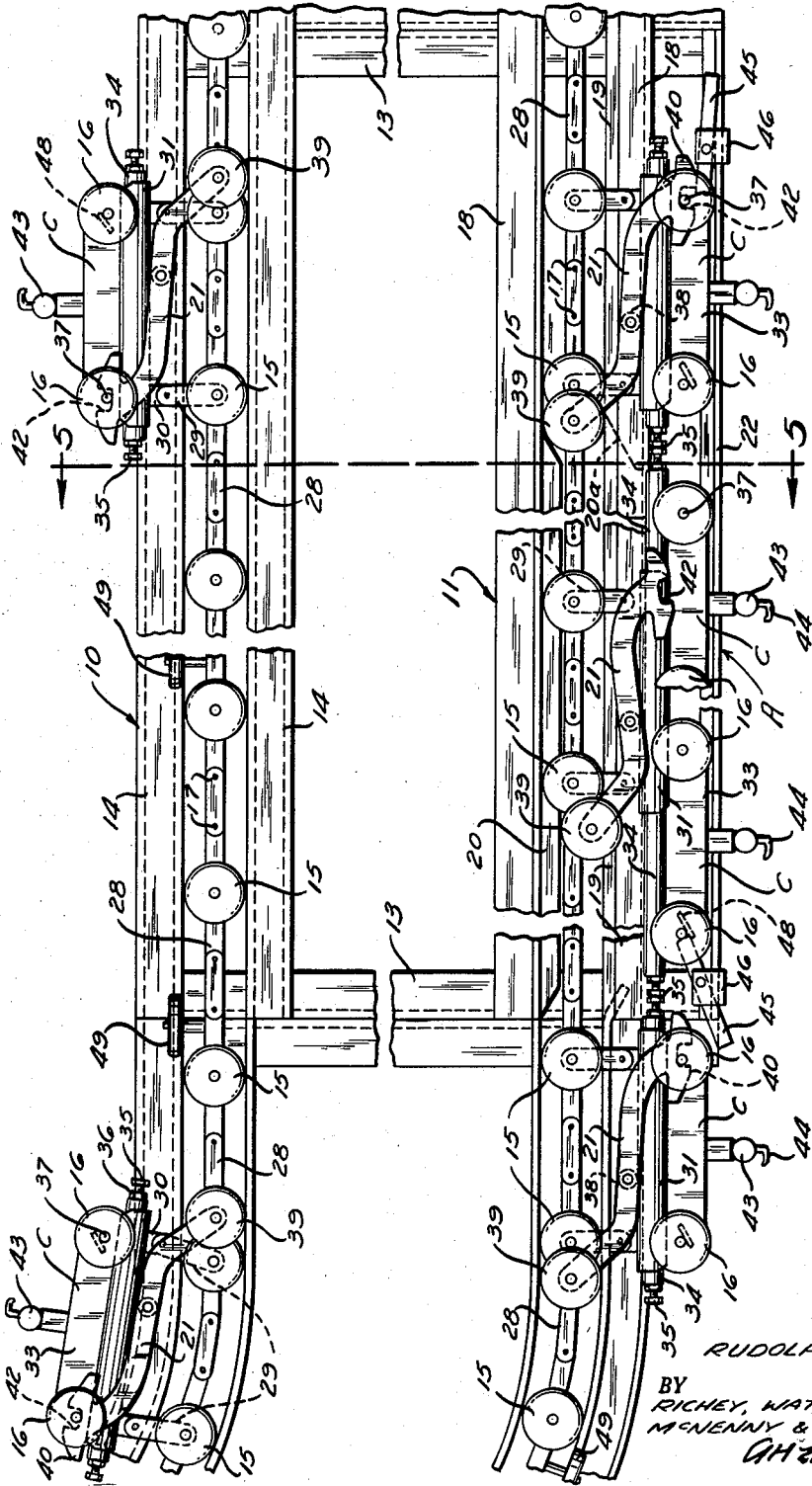
Fig. 4 is a detail side elevational view of a fragmentary portion of the track and accumulator station, the latter having carriages therein; the drawing is shown upon an enlarged scale to illustrate with greater clarity the structural form of the parts, the portion of the track shown in the drawing is indicated by the line 4—4 in Fig. 3.
Figure 5:
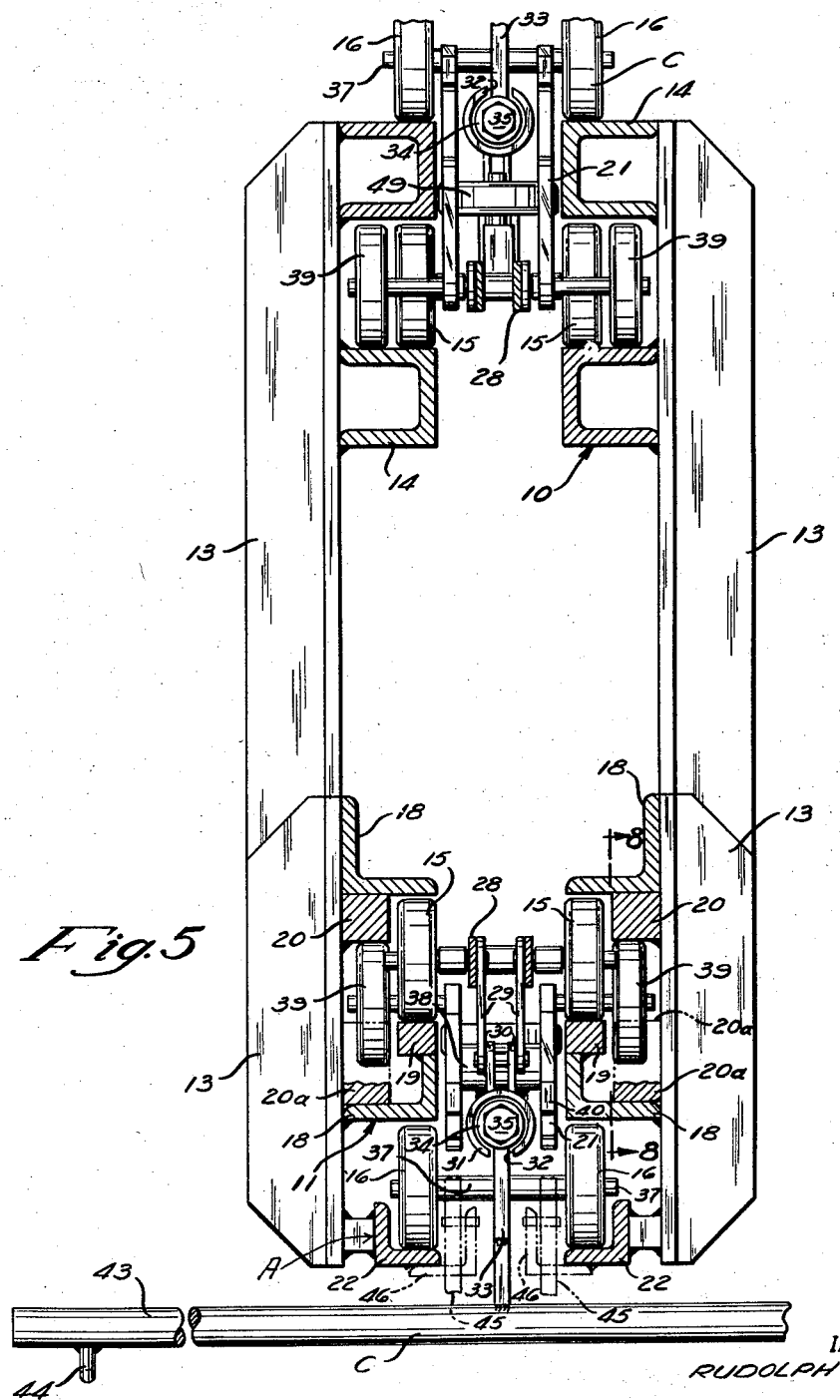
Fig. 5 is a vertical sectional view through the track and accumulator shown upon an enlarged scale, the section being taken on a plane indicated by the line 5—5 in Fig. 4.
Figure 7:
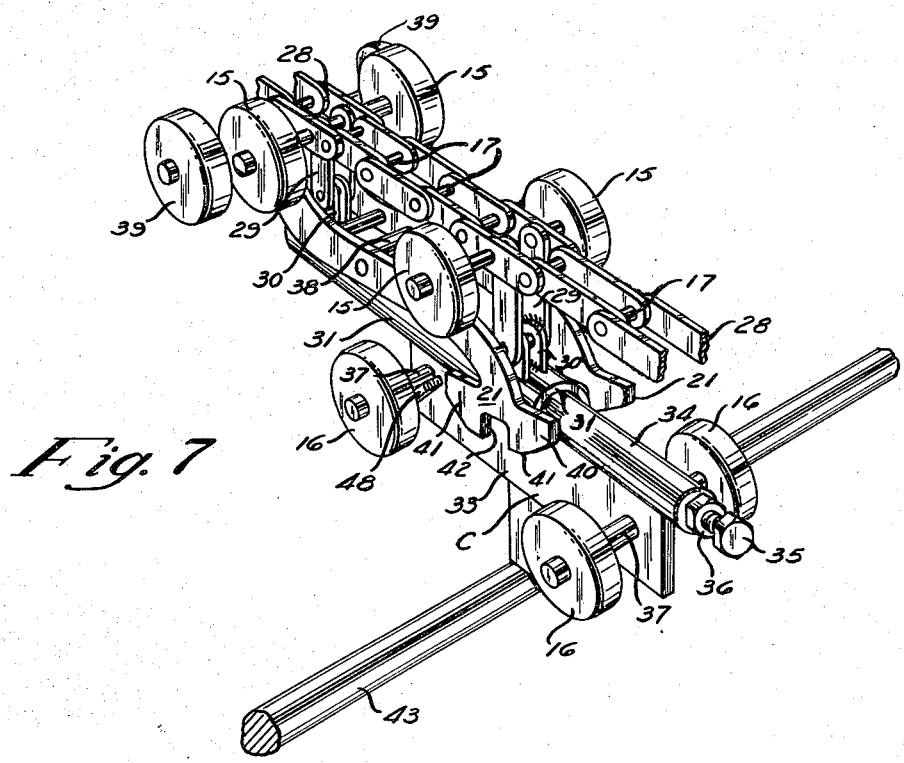
Fig. 7 is a view in perspective of one of the carriages illustrating the structure of the carriage, the relation thereof to the chain, and coupling levers.

Referring first to Figs. 1 and 5, the track assembly comprises a horizontal upper track 10, a lower horizontal track 11, which are merged at one end thereof to form a vertical track section 12. Each horizontal track embodies a pair of horizontally spaced rails disposed in parallel relation. As will be seen in Fig. 5, the upper track 10 is formed of a pair of horizontally spaced parallel channel irons 14 arranged with the web portions thereof in confronting relation, and a second subjacent pair of horizontally spaced parallel channels 14. The subjacent channels are retained in vertical spaced relation with the upper channels a distance slightly greater than the diameter of wheels 15 on cross pins in a chain, the pins constituting axles for wheels that support a plurality of carriages C. The upper faces of the upper flanges of the channels 14 support wheels 16 (which are of the same diameter as the wheels 15), mounted on cross pins in a subtended vertical plate on the carriages C (Figs. 4 and 7). The lower track 11 is formed from a pair of horizontally spaced parallel angle irons 18 and a second pair of horizontally spaced parallel subjacent angle irons 18 retained in vertical spaced relation with the upper angle irons by the angle irons 13. The subjacent angle irons 18 have lineal bars 19 welded on the top of the vertical flanges thereof to form a track for the wheels 15 (Figs. 4 and 5) of the carriages C, and the lower faces of the lateral flanges of the upper rails 18 have lineal cams 20 (Figs. 4 and 5) welded thereon for operation of carriage coupling levers 21 (Fig. 4). The lower track 11 further includes a subtended third track constituting an accumulator track for the carriage C. This track comprises a pair of horizontally spaced angle irons 22 (Fig. 5) supported by the angle irons 13 below the lower angle irons 18 and spaced vertically therefrom. The translation of the carriage is effected by an endless chain which preferably comprises a plurality of flat links united by cross pins 17 engaged, respectively, with the teeth of an idler sprocket wheel 23 which is mounted between the vertically spaced tracks 10 and 11 and between the parallel channel rails 14 thereof adjacent the upper end of the vertical section 12 of the track. The opposed end portion of the chain is entrained about a drive sprocket 24 between the tracks 10 and 11 and between the angle irons 18 adjacent the ends thereof. The sprocket 24 is keyed to a shaft 25 driven by a speed reduction gear set 26, which in turn, is driven by an electric motor 27 (Fig. 3).

Figure 6:
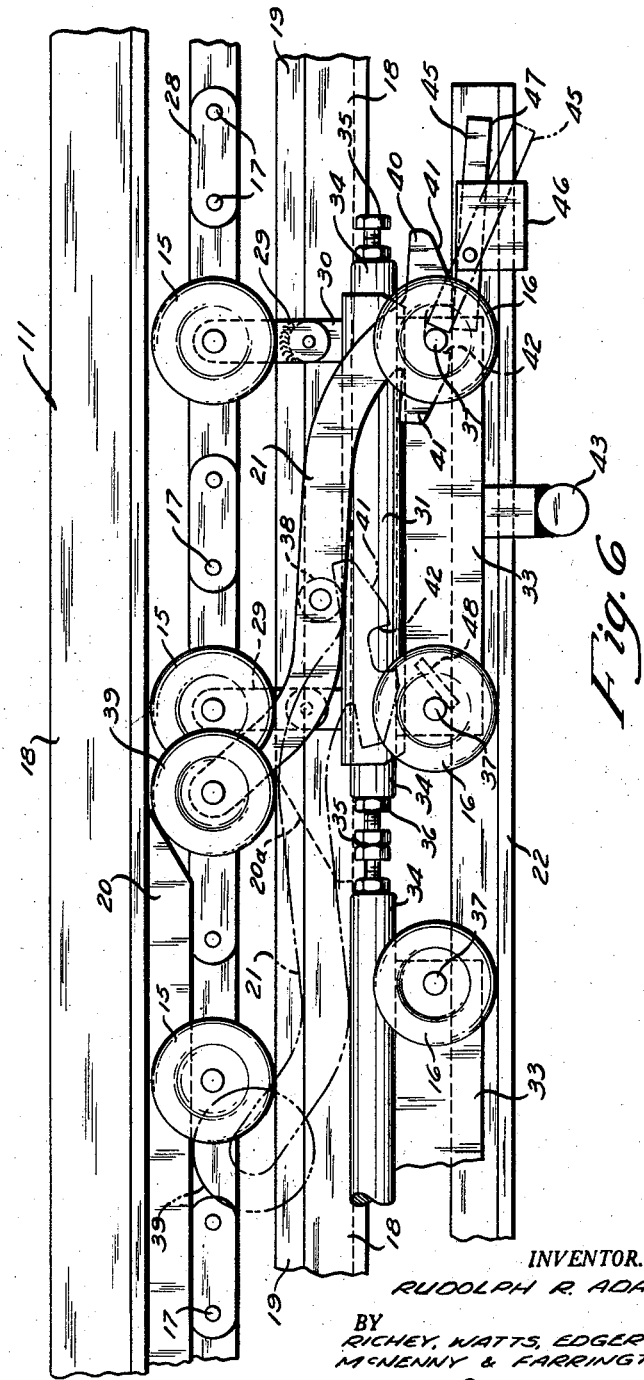
Fig. 6 is an enlarged side elevational view of one of the carriages, the forward end of the following carriage, and a fragmentary portion of the accumulator track illustrating the relation of the cam rail, stop bars, and the recoupling lever.
Figure 8:
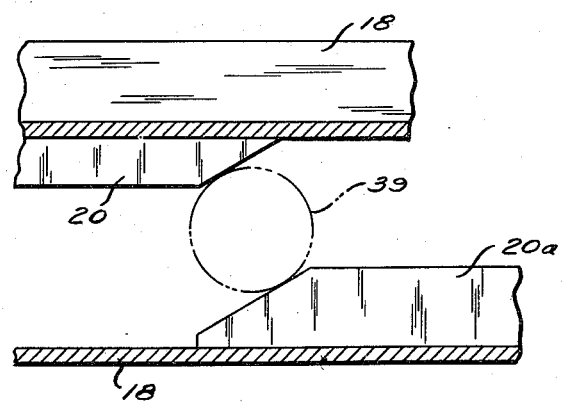
Fig. 8 is an enlarged detail side elevational view of a fragmentary portion of Fig. 6 showing the relative positions of the cam rails and angle irons.

The links of the chain 28 are provided with subtended arms 29 (Fig. 7) pivoted at their upper ends to the inner faces of the outer links of the chain and fixed at their lower ends to ears 30 welded to the upper faces of a tube 31 having a kerf 32 throughout the length of the lower face thereof (Fig. 5). Each carriage C embodies a vertical plate 33 having the upper edge thereof welded to a rod 34 adapted for free sliding movement through the tube 31. The ends of the rod are drilled and tapped for set screws 35 having jamb nuts 36 thereon to prevent rotation thereof. The body of the plate 33 is drilled adjacent the ends thereof for the rigid support of axles 37 that retain the wheels 16. A pair of arms forming the coupling lever 21 are pivoted in journal bearings 38 welded on the top of the tube 31, and a pair of wheels 39 are rotatively mounted on stub axles on the upwardly bent ends of the levers. The opposed downwardly bent ends of the levers 21 are formed with shoes 40 thereon having upwardly inclined ends 41 on the lower ends thereof, and central notches 42 therein proportioned for engagement over the axles 37 of the carriages. The accumulator station A is suspended from the lower angle irons 18 of the lower rail. This frame supports a given number of work-holding carriages in a stationary position during the operation of the conveyor. The wheels 39 on the coupling levers 21 normally engage the lower face of the lower angle iron 18 but when a carriage enters the accumulator station A (Fig. 4), the wheels 39 are depressed as they engage the cams 20. Such movement of the levers effect the elevation of the forward end thereof and releases the notch 42 in the shoes 40 from the axles 37 of the subjacent carriage C. The inclined ends of the shoes 40 then override the carriage axles within the accumulator when the wheels 39 are depressed by the cam rail 20 (Figs. 4 and 6). When the carriages in the accumulator are advanced to the right, as shown in Fig. 6, the wheel 39 will leave the end of the cam rails 20, and be engaged by a lower cam 20a mounted on the face of the lower angle iron 18. Thus the right hand end of the levers 21 will descend, and the notch 42 in the shoe 40 (Fig. 8), will engage the axle 37, thereby connecting the carriage and pushing it from the accumulator station.

In the embodiment illustrated herein, the plate 33 on each carriage has a transverse bar 43 affixed thereon which is provided with hooks 44, in the ends thereof, for the reception of the work piece or pieces to be conveyed, for example the bed springs indicated in the dot-dash lines in Fig. 1.

An attendant on one of the upper floors of the building loads the carriages C successively as they are brought up to him by the chain 28, and a second attendant on the floor below the loading area of the conveyor, periodically removes the work pieces in the accumulator. The carriages are retained in the accumulator station by a pair of bars 45 pivotally mounted on brackets 46 secured to the bottom angle iron 22 of the accumulator A. The bars are fulcrumed above the centers thereof so the lower ends 47 will fall by gravity and bring the upper ends thereof into abutting engagement with the axle 37 of the adjacent carriage. The inclined ends 41 of the shoes 40 override the ends of the stop bars 45 and effect the depression thereof (Fig. 6), thus releasing the axle 37. Simultaneously, the notch 42 in the lever 21 reengages the axle 37 causing the forward carriage to leave the accumulator station and be entrained with the chain 28 where it is carried around the circular paths of the track. The levers 21, tubes 31 and associated parts are spaced on the chain in a ratio to the length of the accumulator station A and cams 20 and 20a so that another carriage will enter the accumulator subsequent the departure of the carriage in the forward end thereof. In the event the attendant fails to unload the last carriage, the movement of the chain may be stopped by engagement of the work piece with an electric switch (not shown). The rear axle 37 of each carriage is provided with upwardly inclined plates 48 which effect a similar depression of the bars 45 as they pass thereover. The chain 28 is provided with spaced horizontally disposed wheels 49 (Figs. 2, 3 and 5) which engage the sides of the channels 14 or angle irons 18 as the case may be to restrain side sway of the chain 28.

The pivotal mounting of the arms 29 on the chain 28 facilitates negotiation of the carriages through arcuate portions of the track, such as shown in Figs. 1 and 4.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An overhead conveyor comprising an upper end and a lower track disposed in spaced parallel relation with each other, each track embodying pairs of horizontally spaced parallel rails with one pair being vertically spaced with respect to the other, sprocket wheels mounted at the ends of said tracks and said spaced rails, an endless chain entrained about said sprocket wheels and driven thereby, wheels carried by certain of the links of said chain and engageable with the rails of said lower track of each pair, a third track connected to and subtended from said lower track in vertically spaced parallel relation therewith, said third track constituting an accumulator track, spaced cams positioned on said lower track superjacent said accumulator track, arms depending from certain of the links in said chain, a tube pivotally connected at its respective ends to said arms, said tube having an axially extending slot in the lower face thereof and constituting a guideway, a journal bearing mounted on the upper face of said tube and extending transversely thereof, a lever pivotally supported by said bearing and having a notch in one end and a wheel on the other end thereof, a carriage including a vertically extending plate, a lineal guide rod affixed to the top of said plate and slidably mounted in said tube with a portion of said plate positioned in said slot, axles affixed to said plate adjacent the ends thereof and in normal relation thereto, wheels mounted on said axles and engageable with said rails, the notch in said lever engaging an axle in said plate to connect said carriage to said chain and move said carriage along said tracks, the wheel on said lever engaging one of said cams, to pivot said lever and disengage said notch from said axle as the wheels on said axle move the carriage onto one end of said accumulator track, and said wheel on said lever engaging the cam to move the notched end of said lever into engagement with an axle of a carriage at the other end of said accumulator track to move the carriage off of the accumulator track and along said first named tracks.

2. A conveyor as set forth in claim 1, which includes stop bars adjacent an end of said accumulator track, each stop bar being pivoted so one end thereof will fall by gravity and the opposed end will be elevated to arrest the movement of said carriages in said accumulator track, and means carried by said tube for pivoting said stop bar.

3. A conveyor as set forth in claim 2, which includes an inclined surface adjacent the notched end of said lever to depress the stop bar on said accumulator track as said carriages pass therethrough.

4. A conveyor as set forth in claim 1, which includes a depending work carrying hook on each of said carriages.

5. A conveyor as set forth in claim 1, which includes coaxial aligned screw threaded stops in the ends of said guide rods on said carriages for lineal adjustment of the carriages in said accumulator track.

6. A conveyor assembly comprising an upper and a lower track disposed in vertically spaced parallel relation with each other, each track embodying pairs of horizontally spaced parallel rails with one pair being vertically spaced with respect to the other, sprocket wheels mounted at the opposed ends of said track and said spaced rails, an endless chain entrained about said sprocket wheels, means for driving said sprocket wheels, wheels carried by certain of the links of said chain engaged with the rails of said lower track of each pair, a third track constituting an accumulator track subtended from said lower track and disposed in vertically spaced parallel relation therewith, cams on said lower track, depending arms on certain of the links of said chain, tubes having an axial slot throughout the length of the lower face thereof pivotally connected to said arms, a bearing mounted on each of said tubes and extending transversely of the tubes, a lever pivotally journaled in each of said bearings, each lever having a notch in one end and a wheel on the opposed end engageable with said cams, carriages movable over said rails of said tracks, each carriage comprising a central vertical plate, axles affixed thereon normal thereto, the notched end of said lever engaging a carriage axle, wheels on said axles engaged with the upper track and the third track, a lineal rod welded to the top of said plate in each of said carriages and telescopically engaged with said tube, one of said cams being of a configuration to elevate the notched end of said lever arm out of engagement with the axle of a carriage in said accumulator track, and said second cam to interlock the notched end of said lever with said carriage axle whereby said carriage will be propelled by said chain when they are out of said accumulator track.

References Cited in the file of this patent

UNITED STATES PATENTS

| | | |
|---|---|---|
| 865,849 | Ardell | Sept. 10, 1907 |
| 2,751,851 | Curtis et al. | June 26, 1956 |
| 2,751,852 | Jay | June 26, 1956 |
| 2,812,724 | King | Nov. 12, 1957 |
| 2,816,643 | Klamp | Dec. 17, 1957 |

FOREIGN PATENTS

| | | |
|---|---|---|
| 564,238 | France | Oct. 16, 1923 |
| 735,907 | Great Britain | Aug. 31, 1955 |